Nov. 27, 1923.

I. TROLLEY 1,475,203

TRACTOR HITCH FOR AGRICULTURAL IMPLEMENTS

Original Filed July 17, 1918    8 Sheets-Sheet 1

WITNESSES

INVENTOR
Isaac Trolley
BY
Rogers, Kennedy & Campbell
ATTORNEYS.

Nov. 27, 1923.

I. TROLLEY 1,475,203

TRACTOR HITCH FOR AGRICULTURAL IMPLEMENTS

Original Filed July 17, 1918   8 Sheets-Sheet 3

Nov. 27, 1923.

I. TROLLEY 1,475,203

TRACTOR HITCH FOR AGRICULTURAL IMPLEMENTS

Original Filed July 17, 1918      8 Sheets-Sheet 7

INVENTOR
Isaac Trolley
BY
Rogers Kennedy & Campbell
ATTORNEYS

Nov. 27, 1923.
1,475,203
I. TROLLEY
TRACTOR HITCH FOR AGRICULTURAL IMPLEMENTS
Original Filed July 17, 1918   8 Sheets-Sheet 8
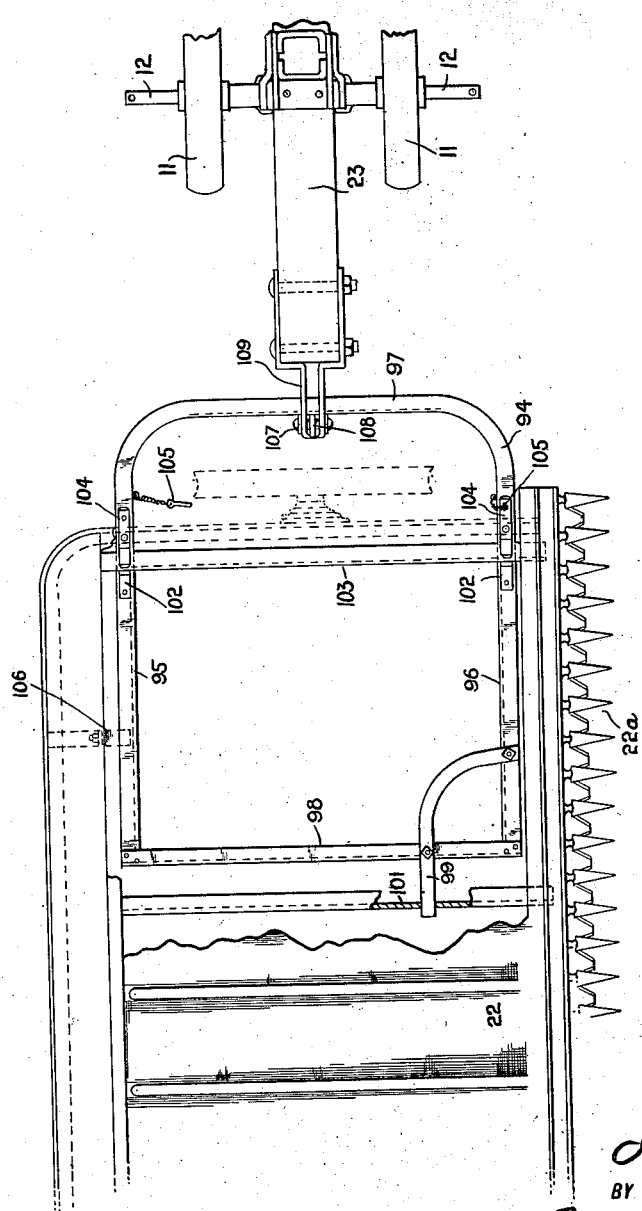

Patented Nov. 27, 1923.

1,475,203

UNITED STATES PATENT OFFICE.

ISAAC TROLLEY, OF POUGHKEEPSIE, NEW YORK, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTOR HITCH FOR AGRICULTURAL IMPLEMENTS.

Application filed October 15, 1918. Serial No. 258,147.

*To all whom it may concern:*

Be it known that I, ISAAC TROLLEY, a citizen of the United States, residing at Poughkeepsie, in the county of Dutchess and State of New York, have invented certain new and useful Improvements in Tractor Hitches for Agricultural Implements, of which the following is a specification, reference being had therein to the accompanying drawings.

This invention relates to means for connecting agricultural implements to tractors so that the implement will trail behind the tractor in the passage of the latter through the field, and the invention has reference more particularly to the connection of a grain binder to a tractor so that it may be either drawn through the field in operative relation to perform its usual functions, or may be disconnected from the tractor and reconnected thereto in inoperative relation for transportation.

In application for Letters Patent of the United States filed by me on the 17th day of July, 1918, Ser. No. 245,410, I have described a form of connection between a tractor and grain binding machine in which said parts are capable of certain relative movements when passing over rough or uneven ground, and in which provision is made for the adjustment of the binder relatively to the tractor to vary the height of the cutter bar from the surface of the ground. In said mechanism, the tractor is controlled by certain controlling devices removably mounted on the binder frame within reach of the driver occupying the usual driver's seat, which controlling devices are connected by rods directly with the mechanism of the tractor for controlling the admission of gas, the clutch, and the change speed gears, these devices, when the binder is disconnected from the tractor and reconnected thereto for transportation, being transferred to the tractor and controlled by a driver occupying a seat on the tractor. Also in the construction of said application, provision is made for maintaining the same distance between the controlling devices when mounted on the binder frame, and the tractor, irrespective of the changing relations between the two machines, due to the travel over uneven ground, and due to the adjustment of the binder in raising and lowering the cutter bar. This is effected by mounting the several controlling devices on a stand or support sustained by the binder frame to move relatively thereto backwards and forwards, which stand is removably attached so that it can be taken off the binder and transferred to the tractor when the binder is connected for transportation. In transferring the controlling devices from the frame of the binder to the tractor, considerable difficulty is encountered in re-establishing the proper operative relation between the controlling devices and the mechanism of the tractor controlled thereby, and in effecting the proper adjustment of the parts in their new positions, these re-adjustments causing considerable delay in making the change.

The present invention is an improvement on said previous mechanism, and aims to avoid the objections mentioned, and the invention consists in mounting the controlling devices permanently on the tractor, and in providing detachable extension members or rods for the several devices, which rods, when the binder is connected to the tractor in operative relation thereto, will extend rearwardly to the binder within reach of the driver occupying the usual driver's seat, and which rods, when the binder is connected to the tractor for transportation, are detached from the controlling devices so that the latter may be operated by the driver occupying the seat on the tractor. As a result of this arrangement and construction of the parts, the relations of the controlling devices and the tractor mechanism operated thereby, are not disturbed, and no re-adjustment of these parts is necessary, when the binder is disconnected from its operative relation to the tractor and connected thereto for transportation.

Figure 4:
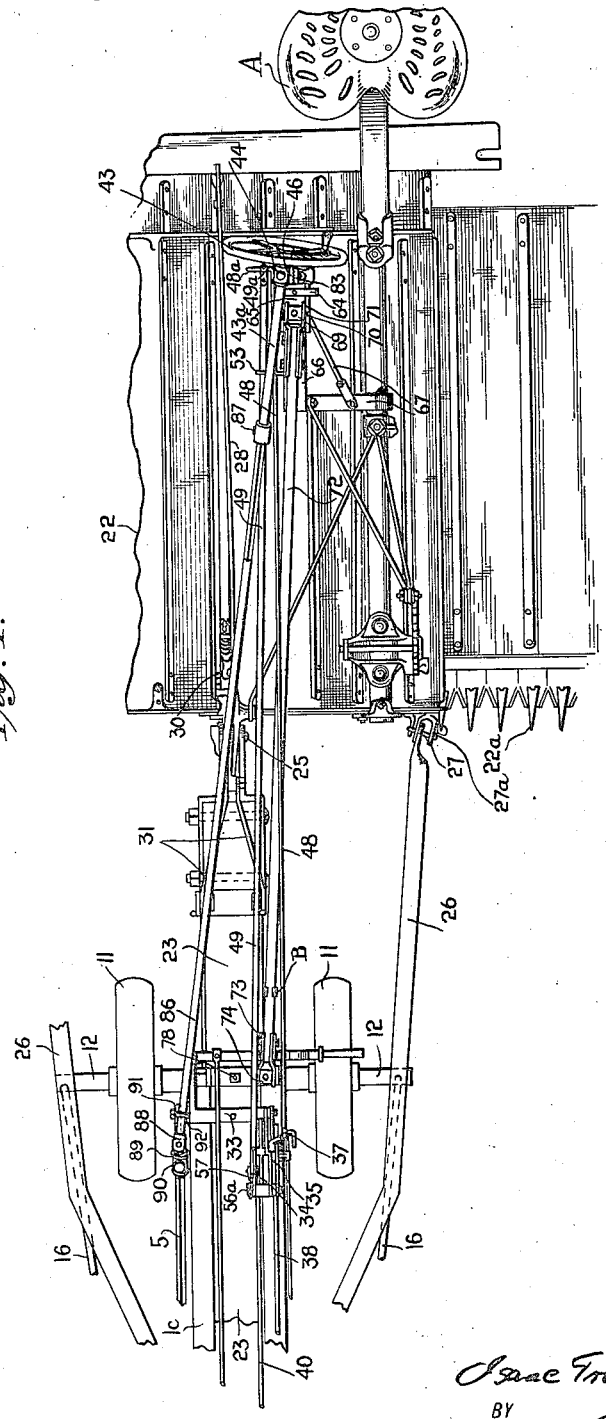
Fig. 4 is a top plan view of the parts shown in Fig. 1.

Figure 4ᵃ is a plan view with a number of the parts cut away to show the lower part of the mechanism and the connections to the binder.

Figure 5:
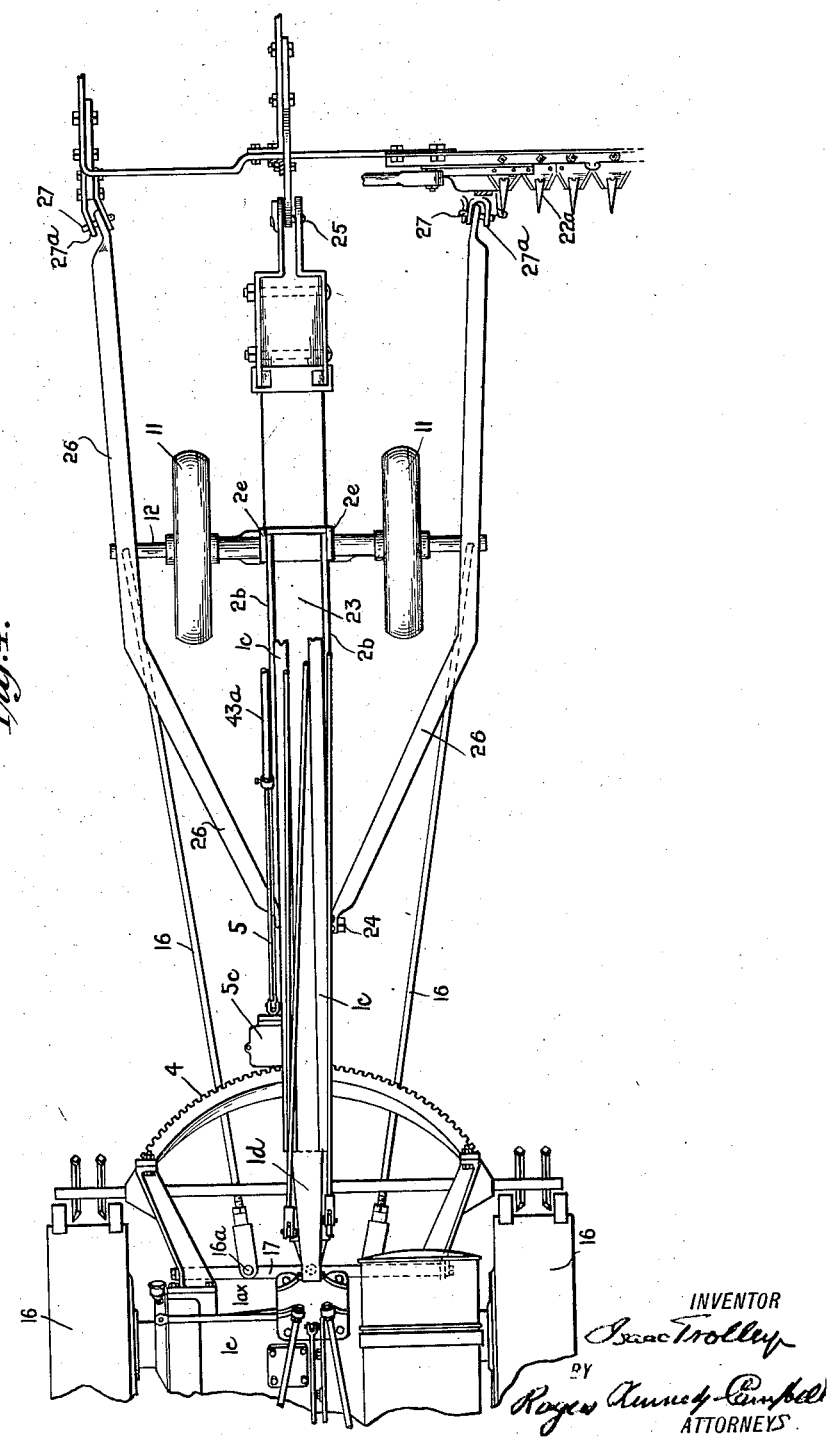

Fig. 5 is a fragmentary perspective view on an enlarged scale showing the rear portions of the detachable extension devices for operating the controlling levers from the seat on the binder, and showing the manner of supporting said devices on the binder frame.

Figure 6:
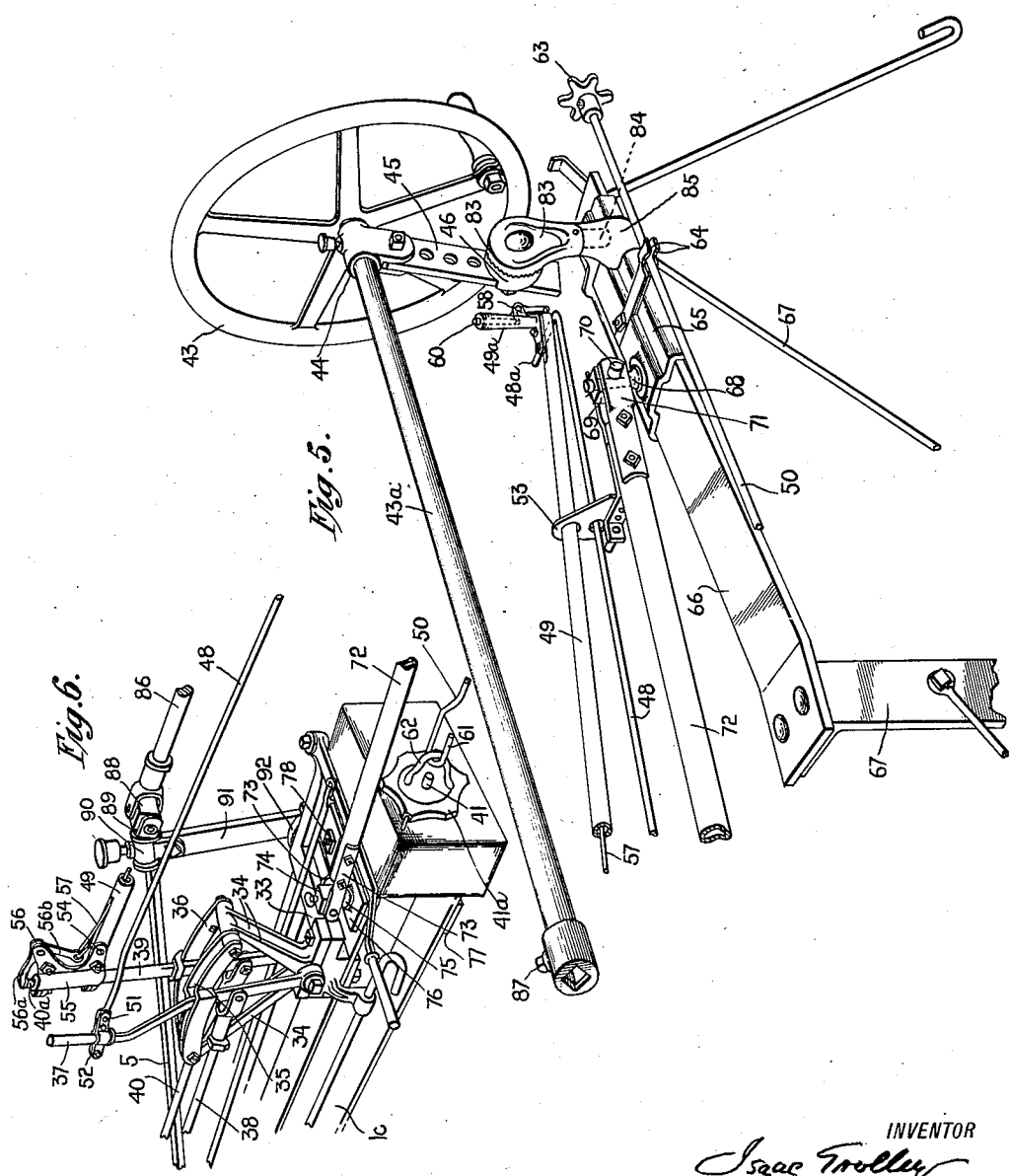

Fig. 6 is a similar view of the forward portions of said devices and the connected operating levers on the tractor.

Figure 7:
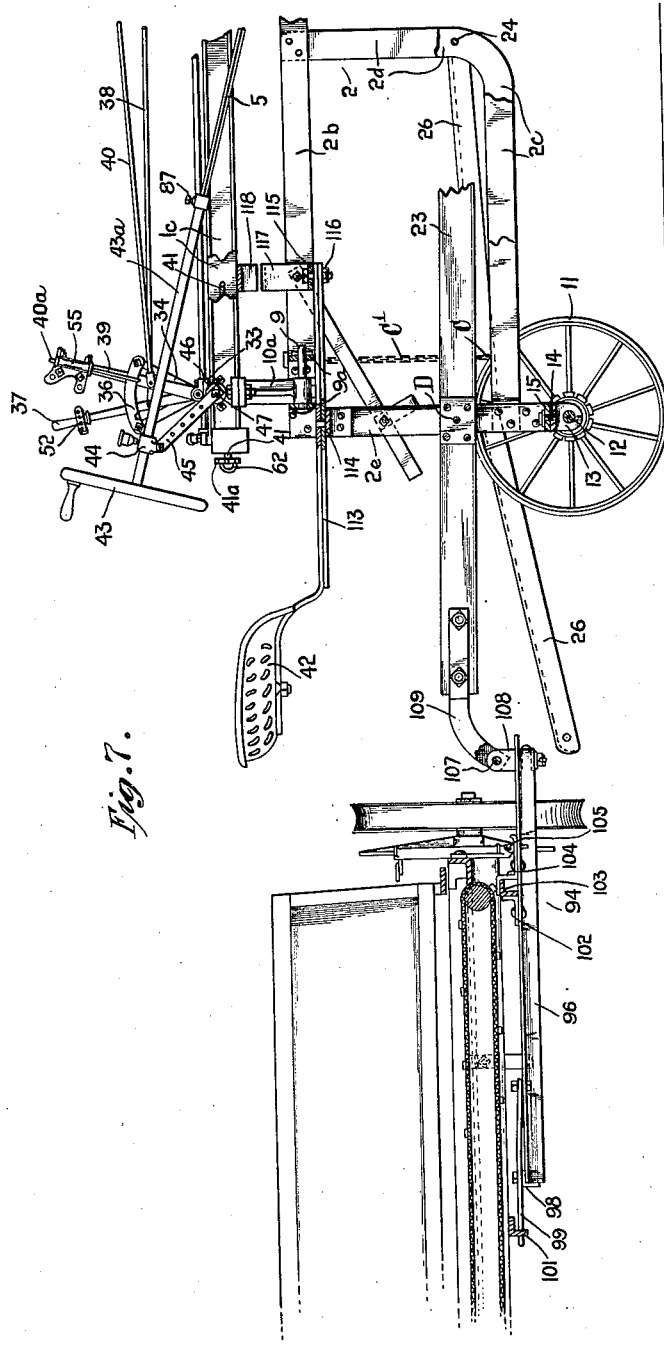

Fig. 7 is a side elevation of the rear end of the tractor and grain ends of the binder platform, showing the parts connected for transportation of the binder.

Fig. 8 is a top plan view of the same, with certain parts removed.

Referring to the drawings:

Referring particularly to Figs. 1 to 6, 1 designates a tractor consisting of a power unit 1ᵃ and a supporting truck 2. The power unit is operated by a gas engine mounted in a frame 1ᵃˣ, supported by two power operated traction wheels 1ᵇ. Extending rearwardly from this frame is a horizontal beam or frame bar 1ᶜ, the forward end of which is in the form of a vertical yoke 1ᵈ pivoted to the frame 1ᵃˣ on a vertical axis so that the frame may be swung horizontally relatively to the beam in guiding the tractor. Carried by the beam is a rotary pinion 3 which meshes with a horizontal segmental rack 4 fixed to the frame 1ᵃˣ and curved from a centre coincident with the axis of the pivotal connection of the yoke with the frame, the rotation of the pinion, assuming that the beam is held against lateral motion, causing the frame 1ᵃˣ to turn relatively to the beam, by which means the guiding of the tractor is effected. The pinion is operated by a squared rotary operating shaft 5 connected at its forward end by a gimbal joint 5ᵃ to a horizontal short shaft 5ᵇ geared to the pinion within a gear box 5ᶜ. The shaft 5 extends rearwardly and upwardly and is adapted to be operated either by the driver occupying the usual seat on the binder frame when the binder is connected in operative relation to the tractor, or by the driver occupying a seat on the tractor, when the binder is connected to the tractor for transportation, as will be more fully described hereinafter.

The supporting truck 2 extends beneath the beam 1ᶜ and supports the same, thereby preserving the horizontal equilibrium of the power unit. This truck is in the form of two upright rectangular frames connected together side by side in fixed spaced relations and constituting a unitary frame structure with spaced upper and lower horizontal bars 2ᵇ and 2ᶜ, and spaced front and rear vertical bars 2ᵈ and 2ᵉ. The upper bars 2ᵇ have fixed between them at the front and rear, horizontal, longitudinally extending supporting pins 9 mounted in cross plates 9ᵃ fixed between the bars, upon which pins are respectively mounted so as to rock and slide thereon, the lower ends of two arms 10 and 10ᵃ depending from the beam 1ᶜ at the front and rear. By this means the truck frame is capable of a limited motion relative to the beam, both in a fore and aft direction and about a fore and aft axis. The rear end of the truck frame is supported from the ground by two truck wheels 11 journaled on a horizontal axle 12 carried in a yoke or frame 13 pivoted on a vertical axis as at 14 to a hanger strap 15 connected fixedly with the lower ends of the rear vertical bars 2ᵉ of the truck frame. The outer extremities of the axle are formed with vertical holes in which extend the rear downwardly turned ends of two fore and aft extending rods 16 whose forward ends are pivoted on vertical axes as at 16ᵃ to a hanger bracket 17 fixed to the frame 1ᵃˣ of the power unit, the pivotal connection of the rods with the bracket being on opposite sides of the axes of the yoke 1ᵈ. As a result of this connection and arrangement, when the frame of the power unit is turned relative to the beam in steering the tractor, the truck wheels will be swiveled or turned in the same direction, thereby effecting a quick and short turn of the machine.

The draft of the power unit is transmitted to the truck by means of a draft rod or link 18 having its rear end turned downwardly and entered loosely in a hole in a horizontal bracket plate 19 fixed between the lower horizontal bars 2ᶜ of the truck frame at the front. This draft rod extends forwardly and is pivoted by means of a vertical pivot pin to a clevis 20, which in turn is pivotally connected by means of a horizontal pivot pin to the lower end of a draft arm 21 depending from the yoke 1ᵈ.

Figure 3:
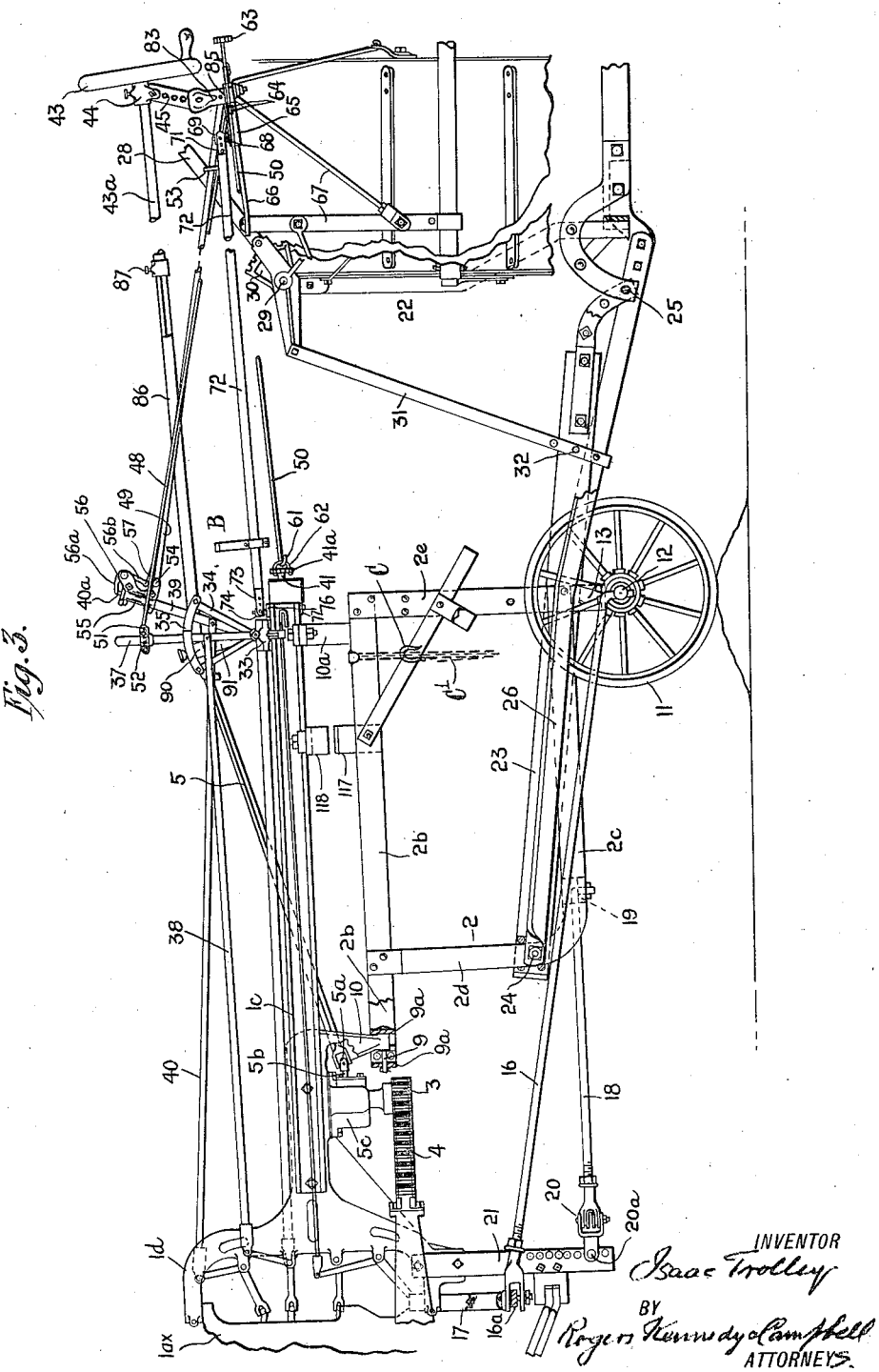
Fig. 3 is a similar view with the parts in different position.

To adapt the tractor for connection with certain forms of farm implements, for instance a grain binder 22 as shown in the accompanying drawings to draw the same through the field for operation on the grain, a draft member in the form of a stub tongue 23 is provided, which is pivoted at its forward end by means of a horizontal pivot bolt 24 between the two front vertical bars 2ᵈ of the truck frame near the lower ends of said bars, the said tongue extending rearwardly between the rear bars of the truck frame and beyond the same, where it is connected pivotally by means of a horizontal pivot bolt 25 with the frame of the binder in a manner similar to the connection of the usual draft tongue therewith. In connection with this draft member or stub tongue as a means for applying the draft to the binder frame, I employ two side draft bars 26 to prevent the side strains on the parts, these bars being pivoted to the truck frame on the pivot bolt 24 before alluded to, and diverging rearwardly and having their rear ends widely separated and pivotally connected by horizontal pivot pins 27 respectively between two pairs of ears on the binder frame, the axes of the pivot pins 27 and the pivot pin 25 being in horizontal coincidence or alignment. Due to this pivotal connection of the binder frame with the truck frame, the binder frame and consequently the grain platform, may be rocked or tilted about the transverse axes of the bull and grain wheels, which tilting action will be in relation to the tractor and will raise and lower the cutter bar 22ª. I propose to provide means for adjusting the binder frame in this manner on the axes of the supporting wheels, in order to vary the height of the cutter bar, which in the present instance is effected by the usual platform adjusting lever 28 pivoted near its lower end on a horizontal axis at 29 to a fixed part of the binder frame alongside a segment frame 30 fixed to the elevator frame at the front. This lever is provided with a locking latch (not shown) which engages between the teeth of the segment frame and thereby holds the lever and connected parts in their different adjusted positions. The lower extremity of the lever is pivoted to the upper ends of two upright links 31 extending at their lower ends on opposite sides of the stub tongue 23 near its rear end and pivotally connected thereto by a horizontal pivot bolt 32. By pushing the lever forwardly, the binder frame will be tilted on the axes of the bull and grain wheels, which will raise the front of the platform and cutter bar, the stub tongue in this action moving upwardly with the connected parts; and by pulling the lever rearwardly, these movements will be reversed and the cutter bar will be lowered, the lever being retained in its adjusted position by locking the same to the segment frame. With the parts locked by the lever, the truck may move upwardly relative to the binder as when passing over uneven ground as shown in Fig. 3, the stub tongue in this action pivoting relative to the truck on the pivot bolt 24. Due to this fact, the weight of the tractor is not imposed on the binder frame, the latter as it trails behind the tractor being subject only to the draft pull of the power unit exerted through the truck.

Figure 1:
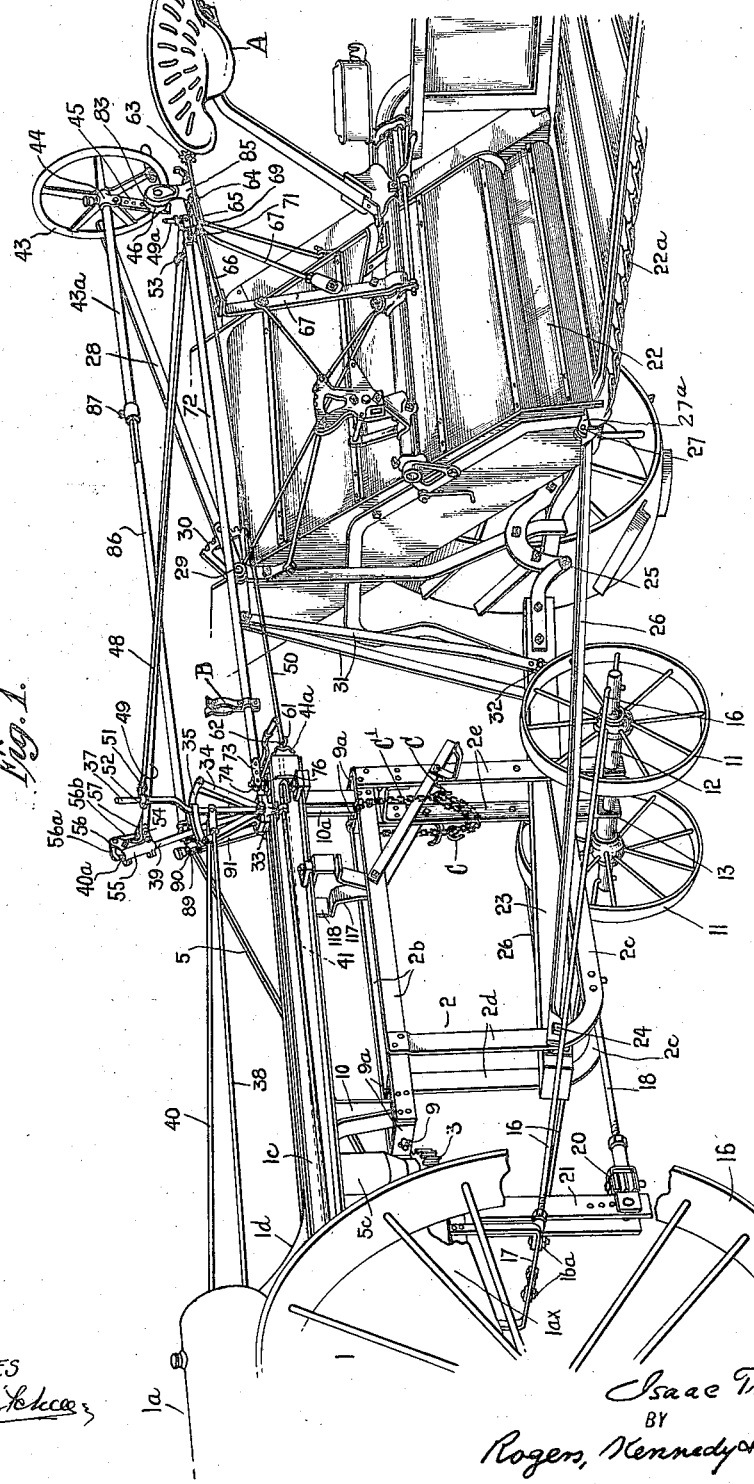
Fig. 1 is a perspective view of the rear portion of a tractor and the stubble end of a grain binder having my invention embodied therein.

As shown more particularly in Figs. 1 and 6 there is firmly applied to the rear end of the beam 1ᶜ of the tractor, a horizontal plate 33 from which rises a segment frame 34 containing at one side an H slot 35 and at the other side a toothed segment bar 36. Pivoted at its lower end to the base of the segment frame is a hand lever 37 which extends upwardly through the H slot and has pivoted to it the rear end of a rod 38 which extends forwardly and is operatively connected to the gear shifting mechanism (not shown) of the tractor. Also pivoted at its lower end to the base of the segment frame is a clutch controlling lever 39 having pivoted to it the rear end of a rod 40 which extends forwardly and is operatively connected with the clutch operating mechanism (not shown) of the tractor. This lever 39 is provided with a locking latch which cooperates with the toothed segment bar 36, and is operated by a latch operating rod 40ª extending through a longitudinal opening in the lever and exposed at its upper end as shown in Fig. 6. Extending longitudinally of the beam 1ᶜ of the tractor is a rotary shaft 41, the forward end of which is operatively connected with the mechanism of the tractor for controlling the admission of fuel or gas, and the rear end of which is rotatably sustained by the beam 1ᶜ and has fixed to it a hand wheel 41ª for rotating it.

By means of these three controlling devices, the two levers 37 and 39 and the hand wheel 41ª, the driver occupying seat 42 detachably applied to the truck when the binder is connected to the tractor for transportation as will be presently described, is enabled to control the clutch mechanism, the speed gears and the admission of gas, these several controlling devices being permanently attached to the tractor and their connection with the tractor mechanism finally and permanently adjusted before the machine leaves the factory.

The guiding of the tractor from the seat 42 is effected as shown in Fig. 7 by means of a hand wheel 43 provided with a stem 43ª having a squared longitudinal opening therein which receives the rear end of the squared shaft 5 before alluded to. This stem is rotatably mounted in a bearing 44 pivoted to the upper end of a standard 45, the lower end of which is seated in a socket in a washer 46 formed with a serrated face and adjustably clamped to the base plate 33 by means of a clamping bolt 47, as shown in Fig. 7. By this means the standard may be set at a forward or rearward inclination for the purpose presently to be described.

Figure 2:
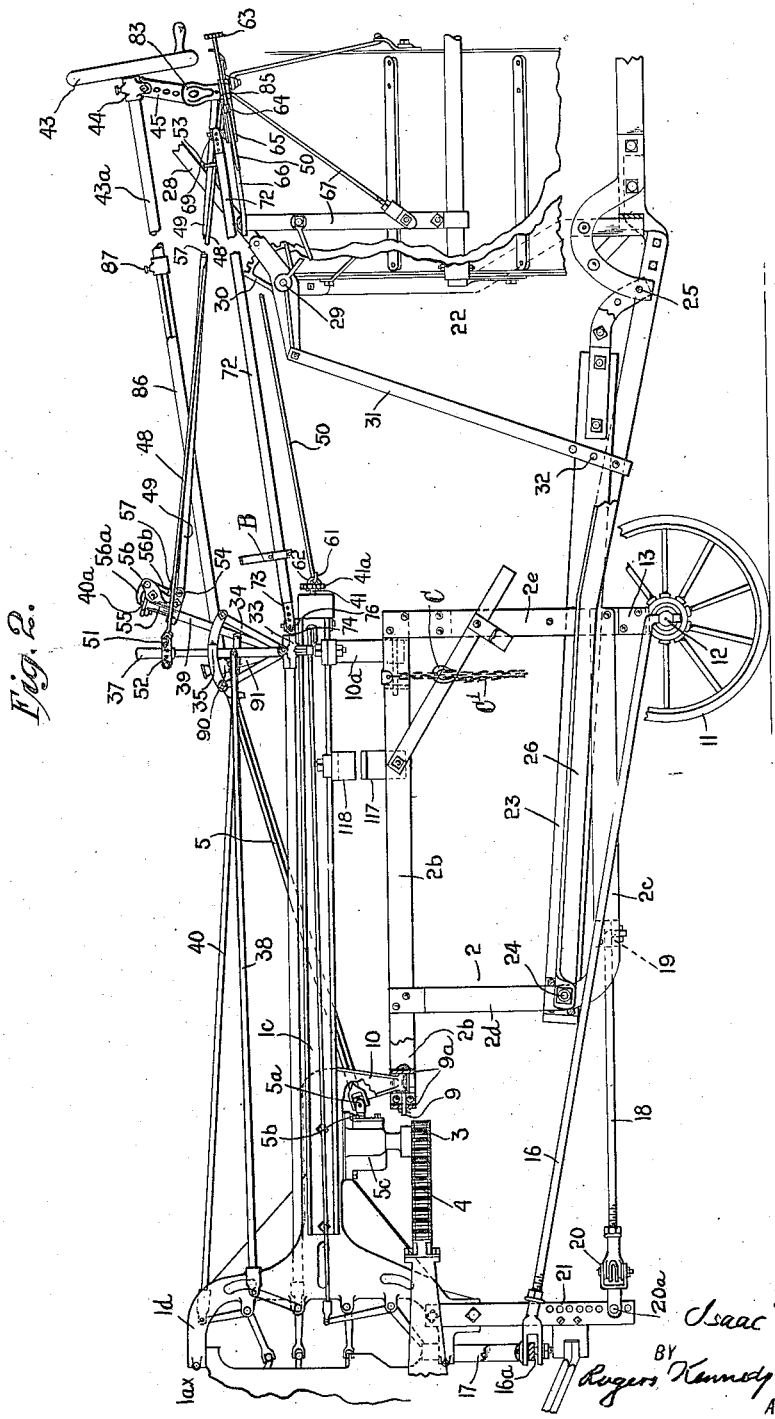
Fig. 2 is a side elevation of the same.

When the binder is connected in operative relation to the tractor as shown in Figs. 1, 2, 3, etc., the clutch, change speed, and gas admission mechanism are controlled by the driver occupying the usual driver's seat A on the binder frame. To enable the tractor to be thus controlled, I provide in accordance with the present invention extension rods 48, 49 and 50 for operating the two levers 37 and 39 and the hand wheel 41ª respectively, which rods are detachably connected at their forward ends to the parts to be operated, and are extended rearwardly and terminate within reach of the driver on the seat A. The rod 48 is pivoted at its forward end by means of a removable pivot bolt 51, to a clip 52 clamped to the handle of the lever 37, and at its rear end it extends loosely through a vertical guide plate 53, the said rod terminating at its rear extremity in a handle 48ª for operating it.

The rod 49 is pivoted at its forward end by means of a removable pivot bolt 54 to a clip frame 55 clamped to the lever 39 whence the rod extends rearwardly loosely through the guide plate 53 and terminates in an upright handle 49ª within reach of the driver on the seat A. The clip frame carries an elbow lever 56, the upper arm 56ª of which bears on the upper exposed end of the latch operating rod 40ª, while the lower arm 56ᵇ is connected to the forward end of a link 57 which extends loosely through a longitudinal opening in the rod 49 and outwardly beyond the end of the same. At its rear end the link is pivoted to the lower arm of an elbow lever 58 pivoted to the handle 49ª, which elbow lever has its upper arm pivoted to the inner end of a sliding pin 60 extending through the handle with its upper end exposed. By this means the locking latch of lever 39 is controlled by the driver on seat A as he grasps the handle 49ª.

Rod 50 is provided on its forward end with a hook 61 which is detachably engaged with an eye 62 on the hand wheel 41ª. The rod extends rearwardly and terminates within reach of the driver on seat A where it is provided with a hand wheel 63 for turning it. Near its rear end the rod extends loosely between spring fingers 64 by which it is supported and guided. The spring fingers are carried by a slide 65 mounted to move back and forth on a fore and aft extending horizontal guide plate 66 sustained by the binder frame in front of the driver's seat by means of uprights 67. The plate 65 carries an upright stud 68 surrounded by a removable block 69 provided with oppositely extending pivot pins 70. These pins extend loosely through a yoke 71 on the rear end of a connecting bar 72 which extends forwardly and is provided with a yoke 73 pivoted to a block 74 removably surrounding an upright stud 75 on a horizontal plate 76 clamped to the rear end of the beam 1ᶜ by means of a clamping plate 77 engaging the under side of the beam, and a clamping bolt 78 extending through the clamping plate and the plate 76. The guide plate 53 for the rods 48 and 49 is carried by the connecting rod 72.

The tractor is guided by the driver on seat A, by means of the hand wheel 43 before alluded to, the stem 43ª of which is rotatably mounted in the bearing 44 on the upper end of a standard 45 which together with the serrated washer 46 was applied to the tractor to support the hand wheel when the latter was applied to the tractor as before explained. The serrated washer is adjustably clamped to a serrated head 83 having a depending stud 84 loosely mounted so as to swivel in a post 85 fixed to and extending upwardly from the slide 65. The stem of the hand wheel surrounds the rear squared portion of an extension shaft 86 and is fastened thereto by a set screw 87. This shaft is connected at its forward end by means of a gimbal joint 88 with a hollow sleeve 89 rotatably mounted in a bearing 90 pivoted to the upper end of a standard 91 whose lower end is seated in a socket in a serrated washer 92 detachably clamped to the base plate 33 by the bolt 47. The said sleeve 89 is formed with a longitudinal squared opening which receives the rear squared end of the guiding shaft 5. It is understood that when the hand wheel 43 is operated from the seat A on the binder as above described, the shaft 86 and connected sleeve 89 are provided in order to form a connection between the shaft 5 and the hand wheel, and that when the machine is to be guided from the tractor by the driver on seat 42, the shaft 86 and connected sleeve 89 together with the bearing 90 and standard 91 are removed from the plate 33 and the standard 45, bearing 44 and hand wheel transferred to the tractor and the standard connected to the base plate 33 with the stem of the wheel surrounding the rear end of the squared shaft 5 as first described.

Due to the fact that the bearing for the hand wheel and the guides for the extension rods 48, 49 and 50 are carried by the slide 65 which is tied to the beam of the tractor frame by the connecting rod 72, there will be no danger of these parts binding or cramping when the truck passes over uneven ground and moves relatively to the binder frame, or when the latter is adjusted by the hand lever 28 to vary the height of the cutter bar, the effect of the connecting rod 72 being to maintain the same distance between the hand wheel and the tractor frame notwithstanding the different relative positions which these parts assume under the conditions above mentioned. Furthermore due to the gimbal joint 88 between the shaft 86 and sleeve 89 by which the rotary motion of the hand wheel is transmitted to the shaft 5 for guiding the tractor, the different relative positions assumed by the tractor and binder will not interfere with the operation of the shaft by the hand wheel. The mounting of the head 83 carrying the bearing in which the hand wheel is mounted as shown in Fig. 5 enables the bearing to assume different angular positions when the hand wheel is applied to right or left hand binders as the case may be. The adjustability of the standard 45 by means of the serrated washer enables the said standard to be set at a rearward inclination as shown in Fig. 7 to bring the hand wheel closer down within the reach of the driver on seat 42 when the binder is connected to the tractor for transportation, and the tractor is controlled by the driver on seat 42.

With the binder connected in operative position to the tractor as shown in Figs 1 to 6, the complete control of the tractor is effected as before explained, by the driver on seat A through the medium of the guiding hand wheel 43, the extension rods 48 and 49, and the rotary shaft 50, by which devices the tractor may be guided, the clutch and gear shafts operated, and the fuel admission controlled. When now the binder is to be disconnected from its operative relation to the tractor and re-connected for transportation, the forward ends of the rods 48, 49 and 50 are disconnected from the levers 37 and 39 and hand wheel 41$^a$ respectively and placed out of the way, in a spring clip B extending upwardly from the connecting rod 72, the latter being disconnected from the stud 75 on the rear end of the beam 1$^c$ and from the stud 68 on the slide 65 by lifting the blocks 74 and 69 from said studs and the detached parts placed on the grain platform of the binder. The side draft bars 26 are disconnected at their rear ends from the binder frame temporarily hung in hooks C on the ends of chains C', see Fig. 7, connected at their upper ends to the upper bars of the truck. The lower ends of the links 31 are disconnected from the stub tongue and the latter raised and connected in fixed relations to the rear bars 2$^c$ of the truck by means of a pin D inserted through holes in said bars and through a hole in the stub tongue. The washer 46, together with the standard 45, is removed from the head 83 and the stem of the hand wheel drawn rearwardly to disengage it from the squared end of the shaft 86. Next, standard 91 with its serrated washer is removed from the base plate 33 together with the shaft 86 and sleeve 89, the latter being slipped off the end of shaft 5; and finally the hand wheel and attached parts are transferred to the tractor and the stem of the wheel slipped over the rear end of the shaft 5 and the parts fastened in position by attaching the washer 46 to the base plate 33. The binder is now fully detached from the tractor and is turned around so that the grain end of the platform will be next the tractor. The opposite end of the binder is elevated to lift the bull wheel off the ground and two transport wheels (not shown) are applied as usual to support the frame at this end. The grain end of the platform is now attached to the tractor by means of a special supporting and connecting frame 94 which is thrust endwise beneath the platform and engaged with the under side of the same after which the end of the stub tongue is connected with the connecting frame as shown in Fig. 7, and finally the seat 42 is applied to the truck of the tractor. As the construction of the connecting frame and its method of attachment to the platform frame is the same as that set forth in my application above referred to, and as this construction in itself forms no part of the present invention, a further detailed description of the same is not necessary.

When the parts are thus connected the driver occupying seat 42 has complete control over the tractor mechanism, and guides the tractor by means of the hand wheel, controls the clutch mechanism, the change speed mechanism, and the gas admission mechanism, by the hand levers 37, 39, and the hand wheel 41$^a$ respectively, all of which parts are permanently sustained by the beam of the tractor as above explained.

It will be understood from the foregoing description that in disconnecting the parts from their operative relations and re-connecting them in inoperative relations for transporting the binder, no re-adjustments of or changes are required in the connections from the controlling levers and wheel 41$^a$ to the parts of the tractor mechanism operated thereby. As a result, these adjustments which were finally made before the tractor left the factory, are not disturbed and no time is lost in making a speedy change from the connection of the tractor and binder in one relation to those of another relation. Further, it will be understood that when the parts are connected in operative relations and the tractor controlled by the driver on the seat of the binder, the tractor and binder are permitted to move freely relatively to each other in passing over uneven ground and their relative adjustments permitted without danger of binding or interference with the extension rods and connections from the tractor to the binder frame, the character of these connections and the method of mounting as above described, giving great flexibility of action under all the conditions encountered in the practical operation of the machine in the field.

In the foregoing description and accompanying drawings I have set forth my invention in the particular detailed form and construction which I prefer to adopt and which in practice has been found to answer to a satisfactory degree the ends to be attained. It will be understood, however, that these details may be variously changed and modified without departing from the spirit of the invention and that the invention is not restricted to any particular form or construction of the parts except in so far as such limitations are specified in the claims.

Having thus described my invention, what I claim is:

1. The combination with a front wheel drive tractor having a rearwardly extending coupling frame pivoted to the tractor to swing about a substantially vertical axis for steering purposes and carrying tractor controlling means, of a stabilizing truck connected to the coupling frame, an implement connected to the stabilizing truck, extension controlling means mounted on the implement, and means for readily connecting the extension controls to the tractor controls when the implement is connected to the stabilizing truck.

2. A hitch for connecting a binder to a two wheel tractor of the unstable type having a coupling frame with tractor controls carried by said frame, comprising a stabilizing truck, connections between the stabilizing truck and the binder permitting the binder to be tilted, control extensions carried by the binder, means for connecting the control extensions to the controls on the coupling frame of the tractor, and mounting means for said control extensions permitting the binder to be tilted to adapt itself to inequalities in the surface of the ground without disturbing the controls.

3. A hitch for connecting a binder to a two wheel tractor of the unstable type having a coupling frame carrying tractor controls, comprising a stabilizing truck having mechanism by means of which it may be pivoted to the coupling frame of a tractor to swing about a substantially longitudinal horizontal axis, means for connection to a binder to transmit the draft to the same and permit the binder to be tilted, tractor control extensions for use on the binder, means for readily connecting and disconnecting the extensions to the tractor controls on a tractor coupling frame, and mounting means for the control extension for supporting them on a binder so that the binder may be tilted and may adjust itself to inequalities in the surface of the ground without disturbing the controls.

4. In combination, a tractor provided with a steering mechanism, a rotary operating shaft connected with said mechanism for operating the same, a standard for supporting said shaft detachably connected to the tractor, an implement connected in operative relation to trail behind the tractor and detachable therefrom, said implement having means associated with it for connecting it to the tractor in transport position, an extension shaft operatively connected with the operating shaft of the steering mechanism, a hand wheel for operating said extension, a standard for supporting said hand wheel detachably connected to the implement, said standard being constructed so that it may be mounted in the position of the first standard to support the steering wheel on the tractor when the implement is connected in transport position.

5. In combination, a tractor provided with a steering mechanism, a rotary shaft sustained by the tractor for operating said mechanism, said rotary shaft having a squared end, an implement connected in operative position to trail behind the tractor, said implement having mechanism by means of which it may be connected to the tractor in transport position, a hand wheel provided with a sleeve having a squared opening, and intermediary extension member between the hand wheel and the rotary shaft, said extension member comprising a sleeve having a squared opening therein to receive the squared end of the rotary shaft, a shaft connected to the sleeve by a universal joint and squared at its rear end to enter the squared opening in the sleeve of the hand wheel, means detachable from the tractor for supporting the extension member on the tractor, and means for supporting the hand wheel on the implement, said hand wheel supporting means being constructed so that it may be mounted on the tractor to support the hand wheel thereon when it is connected directly to the squared end of the rotary shaft of the steering mechanism.

6. In combination, a front wheel drive tractor provided with a rearwardly extending coupling frame, a steering mechanism having a steering shaft extending rearwardly adjacent said frame, an implement connected to the tractor, an extension device connectable to the steering shaft and having a supporting means cooperating with a supporting device on the coupling frame to support the extension member, a steering wheel having means for connecting it to the extension device, said connecting means also permitting the steering wheel to be connected directly to the steering shaft, means for supporting the steering wheel on the implement, said means being connectible to the supporting device on the coupling frame to support the steering wheel when it is connected directly to the steering shaft.

7. The combination with a tractor having controls operable from the rear thereof, of an implement, means for operably connecting the implement to the tractor, a plurality of control rods carried by the implement, means for readily connecting the control rods to the controls of the tractor when the implement is connected to the tractor, and means for supporting and holding said control rods when the implement is not operably connected to the tractor.

In testimony whereof, I have affixed my signature hereto.

ISAAC TROLLEY.